United States Patent
Bouladian (10) Patent No.: US 7,165,785 B2
(45) Date of Patent: Jan. 23, 2007

(54) AIRBAG DEPLOYMENT-CONTROL PROCESS AND APPARATUS THEREFOR

(75) Inventor: Raffi Artine Bouladian, Royal Oak, MI (US)

(73) Assignee: Calsonickansei North America, Inc., Farmington Hills, MI (US)

(*) Notice: Subject to any disclaimer, the term of this patent is extended or adjusted under 35 U.S.C. 154(b) by 423 days.

(21) Appl. No.: 10/884,065

(22) Filed: Jul. 2, 2004

(65) Prior Publication Data

US 2006/0004504 A1    Jan. 5, 2006

(51) Int. Cl.
*B60R 21/16* (2006.01)

(52) U.S. Cl. .................. 280/735; 180/273; 701/45

(58) Field of Classification Search ............. 280/735; 180/271, 273; 701/45
See application file for complete search history.

(56) References Cited

U.S. PATENT DOCUMENTS

| | | | |
|---|---|---|---|
| 5,413,378 A * | 5/1995 | Steffens et al. | 280/735 |
| 5,626,359 A * | 5/1997 | Steffens et al. | 280/735 |
| 6,356,194 B1 * | 3/2002 | Fukui et al. | 340/561 |
| 6,529,809 B1 | 3/2003 | Breed et al. | |
| 7,026,946 B1 * | 4/2006 | Saunders et al. | 340/666 |
| 7,043,997 B1 * | 5/2006 | Mattson et al. | 73/800 |
| 7,063,352 B1 * | 6/2006 | Kumakiri et al. | 280/730.2 |

2003/0033066 A1    2/2003    Farmer

FOREIGN PATENT DOCUMENTS

| EP | 1 080 994 A1 | 3/2001 |
|---|---|---|
| EP | 0 757 635 B1 | 7/2002 |
| EP | 1 033 290 B1 | 4/2004 |

* cited by examiner

*Primary Examiner*—Paul N. Dickson
*Assistant Examiner*—Toan C. To
(74) *Attorney, Agent, or Firm*—Meschkow & Gresham, P.L.C.

(57) ABSTRACT

A process (100) and apparatus (20) for control of a deployment of an airbag (28) for a seat (30) in a motor vehicle (22). Upon issuance of a deployment request ($R_D$) by a vehicular computer (24) intended for a deployment activator (26), a processor (36) intercepts the deployment request ($R_D$). The processor (36) then receives a load mass (M), a load temperature (T), and a load height (H) from a mass sensor (38), a thermal-imaging sensor (52), and a proximity sensor (54), respectively. The processor (36) adjudicates the load mass (M), load temperature (T), and load height (H), to determine a deployment status ($S_D$). A deployment status ($S_D$) of pass ($S_P$) is adjudicated when the load mass (M) is greater than or equal to a reference mass ($M_R$), the load temperature (T) is greater than or equal to a reference temperature ($T_R$), and the load height (H) is greater than or equal to a reference height ($H_R$). A deployment status ($S_D$) of inhibit ($S_I$) is adjudicated otherwise. The processor (36) then passes or inhibits the passage of the deployment request ($R_D$) accordingly.

19 Claims, 9 Drawing Sheets

PRIOR ART

AIRBAG DEPLOYMENT-CONTROL PROCESS AND APPARATUS THEREFOR

TECHNICAL FIELD OF THE INVENTION

The present invention relates to the field of airbag deployment methodology. More specifically, the present invention relates to the field of methodologies preventing airbag deployment when children are in the deployment area.

BACKGROUND OF THE INVENTION

Figure 1:
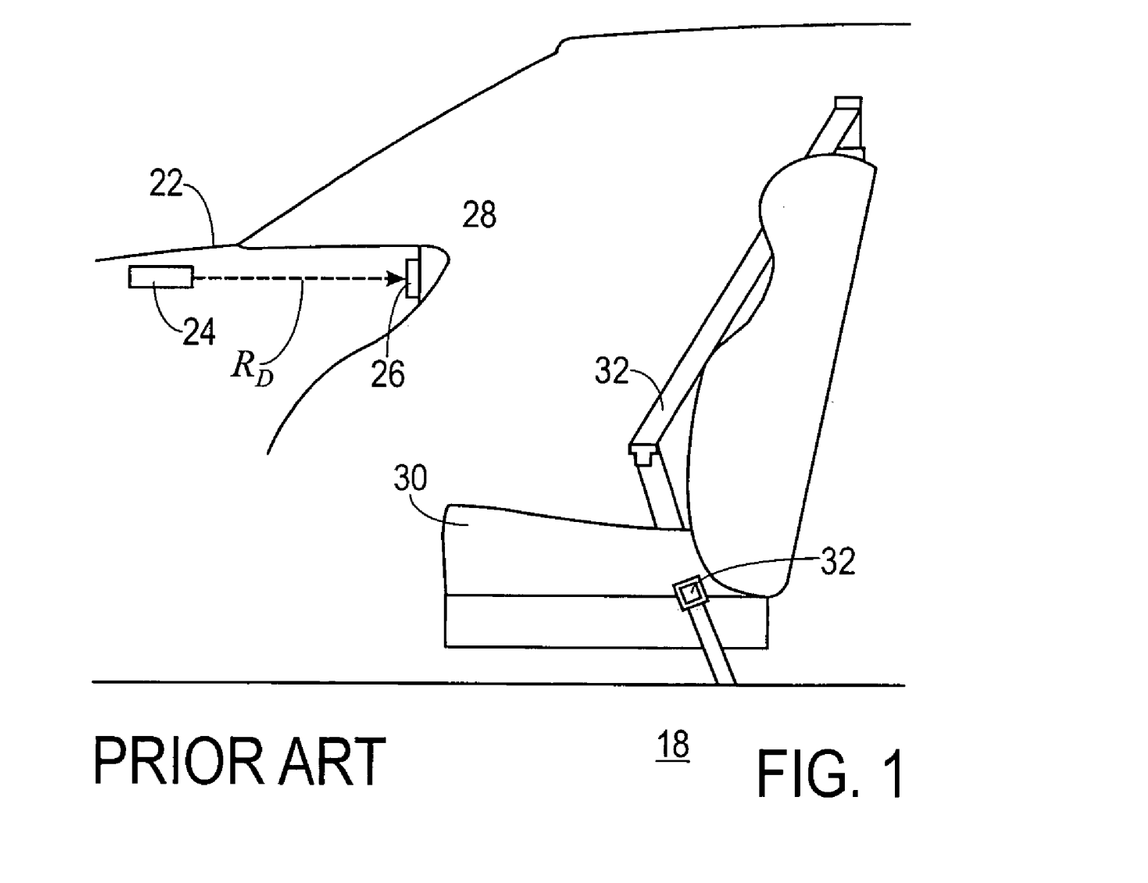
FIG. 1 shows a side view of a prior-art airbag deployment apparatus.

It is common for airbags to be used as an augmentation to seatbelt-provided protection in motor vehicles. FIG. 1 shows a simplified side view of a prior-art airbag deployment apparatus 18. Within a motor vehicle 22, a plurality of collision sensors (not shown) is electrically coupled to a vehicular computer 24. Vehicular computer 24 is electrically connected to a deployment activator 26 attached to an airbag 28.

In the event of a collision, one or more of the collision sensors sends a collision-detected signal (not shown) to vehicular computer 24. Vehicular computer 24 then sends a deployment-request $R_D$ to deployment activator 26. Deployment activator 26 typically contains a charge, which ignites and releases gasses upon receipt of deployment-request $R_D$. The release of these gasses deploys airbag 28.

Airbag 28 is contoured to help restrain and to cushion an average adult human passenger when deployed. Desirably, the passenger is also restrained by a seatbelt 32 (shown in an unused position). The total restraint and cushioning provided serves to protect the passenger from excessive injury.

Potential problems exist when a seat 30 is a front passenger seat and the passenger is not an adult human being.

The "passenger" may be an inanimate object. Airbag 28 is contoured to restrain and cushion an adult human being. Therefore, depending upon the shape and size of the inanimate object, deploying airbag 28 may actually push the inanimate object into the adjacent driver's seat, thereby further endangering a driver above and beyond the danger presented by the collision. This is especially problematical when the inanimate object is not further restrained in the front passenger seat 30 by seatbelt 32.

An especially serious problem exists when the passenger is a child. In this case, deployment of airbag 28 places the child at severe risk of injury or death above and beyond those risks resulting from the collision. That is, deployment of airbag 28 may in and of itself place a child at risk of injury or death. This is especially true when the child is not further restrained by seatbelt 32.

Placing a child in a child carrier does not eliminate the risk of injury or death from the deployment of airbag 28. Indeed, when the passenger is an infant in a rearward-facing child carrier, the risk of injury or death due to the deployment of airbag 28 is greater than the risk of injury or death to a restrained older child in a forward-facing carrier.

In an ideal world, these dangers would not exist, as children and inanimate objects would not be located on front passenger seat 30. Rather, they would be secured in a rear seat where the risk of injury or death is significantly reduced.

In the real world, however, children and/or inanimate objects are often placed on front passenger seat 30, and are often unrestrained by seatbelt 32. Therefore, it is desirable that the deployment of airbag 28 be controlled to minimize the risk of injury or death due to that deployment. To this end, a plurality of prior-art apparatuses and methods of deployment (i.e., airbag deployment systems) have been invented.

A majority of these airbag deployment systems either replace, or require significant modification of, the factory-installed system of a motor vehicle 22. This increases significantly the cost of the system. At the same time, replacing or significantly modifying the factory-installed system adds a layer of complexity, which may increase the likelihood of system failure. For example, the failure of a single connection in an overly complex system may result in a failure of airbag 28 to deploy in the event of a collision when the passenger is an adult human. Worse, a single faulty connection may produce a false deployment signal, thereby causing airbag 28 to deploy when there is no collision. Such a false deployment would pose a totally unnecessary risk of injury or death due to the deployment itself, as well as an additional unnecessary risk of injury or death due to a possible loss of control of motor vehicle 22 by the driver.

What is needed, therefore, is a reliable and simple airbag deployment-control system that does not require replacement or extensive modification of the original (factory-installed) airbag deployment system of motor vehicle 22.

SUMMARY OF THE INVENTION

Accordingly, it is an advantage of the present invention that an airbag deployment-control process and apparatus therefor are provided.

It is another advantage of the present invention that an airbag deployment-control process and apparatus therefor are provided that determines occupancy of the seat prior to airbag deployment.

It is another advantage of the present invention that an airbag deployment-control process and apparatus therefor are provided that inhibits airbag deployment when the seat is occupied by an inanimate object.

It is another advantage of the present invention that an airbag deployment-control process and apparatus therefor are provided that inhibits airbag deployment when the seat is occupied by a child.

It is another advantage of the present invention that an airbag deployment-control process and apparatus therefor are provided that deploys the airbag when the seat is occupied by an adult.

The above and other advantages of the present invention are carried out in one form by a method for control of airbag deployment for a seat in a motor vehicle upon issuance of a deployment request by a vehicular computer within the motor vehicle. The method intercepts the deployment request issued by the vehicular computer and intended for a deployment activator coupled to the airbag, calculates a load mass of a load within the seat, establishes a load temperature of the load, and ascertains a load height of the load. The method adjudicates a deployment status for the deployment of the airbag in response to the load mass, the load temperature, and the load height, wherein the deployment status is to be one of a pass status and an inhibit status. The method then passes the deployment request to the deployment activator when the deployment status is the pass status, or inhibits the deployment request from being passed to the deployment activator when the deployment status is the inhibit status.

The above and other advantages of the present invention are carried out in one form by an apparatus for control of airbag deployment for a seat in a motor vehicle upon issuance of a deployment request by a vehicular computer within the motor vehicle. A mass sensor is coupled to the seat and configured to determine a load mass of a load within the seat. A thermal-imaging sensor is focused upon the seat and configured to determine a load temperature of the load. A proximity sensor is focused upon the seat and configured to determine a load height of the load. A processor is configured to intercept the deployment request issued by the vehicular computer and intended for a deployment activator, and adjudicate a deployment status for the deployment request in response to the load mass, the load temperature, and the load height. The deployment status is either a pass status or an inhibit status. The processor then passes the deployment request to the deployment activator when the deployment status is the pass status, or inhibits the deployment request from being passed to the deployment activator when the deployment status is the inhibit status.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 2:
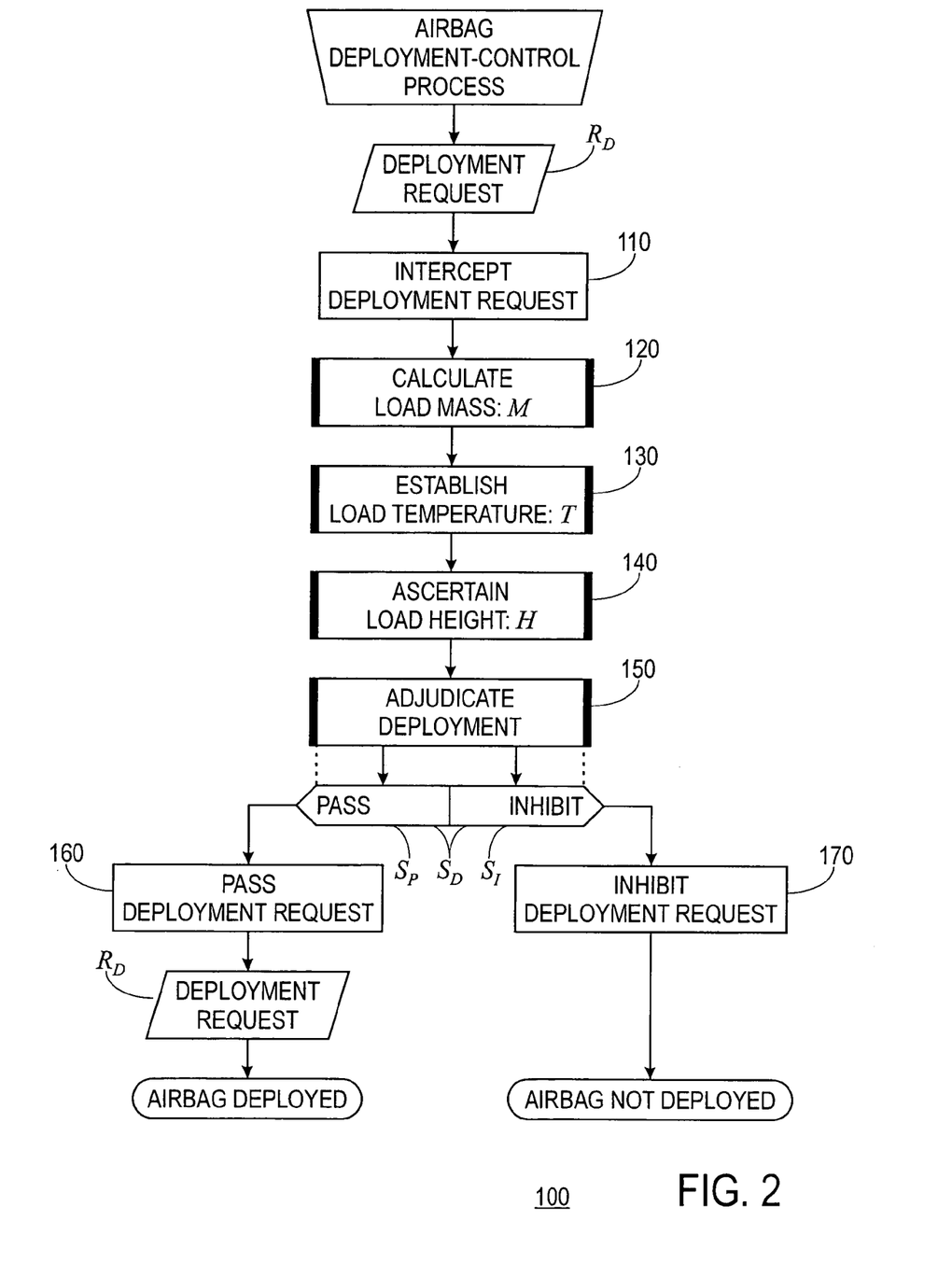
FIG. 2 shows a flowchart of an airbag deployment-control process in accordance with a preferred embodiment of the present invention.

FIG. 2 shows a flowchart of an airbag deployment-control process 100, and FIGS. 3 through 6 show side views of an airbag deployment-control apparatus 20 during deployment assessment with an empty seat 30 (FIG. 3), or with a load 40 for seat 30 of an inanimate object 42 (FIG. 4), a child 44 (FIG. 5), or an adult 46 (FIG. 6) in accordance with a preferred embodiment of the present invention. The following discussion refers to FIGS. 1 through 6.

In the prior art (FIG. 1), a motor vehicle 22 contains a factory-installed airbag deployment apparatus 18. In apparatus 18, a vehicular computer 24 is electrically coupled to a deployment activator 26. In the event of a collision, at least one of a plurality of collision sensors (not shown) sends a collision-detected signal to vehicular computer 24. Vehicular computer 24 then sends a deployment-request $R_D$ to a deployment activator 26. Deployment activator 26 typically contains a charge. The charge is ignited by deployment request $R_D$, and releases gasses that deploy an airbag 28.

Throughout this discussion, it is assumed that seat 30 is a front passenger seat in motor vehicle 22 adjacent to a driver's seat. This is not a requirement of the present invention, however, and seat 30 may be another seat with or without an adjacent seat.

In the preferred-embodiments (FIGS. 2 through 6), deployment request $R_D$ is interrupted by a processor 36. Processor 36 forms the heart of airbag deployment-control apparatus 20. In the event of a collision, vehicular computer 24 dispatches deployment request $R_D$. Deployment request $R_D$ is intended for deployment activator 26.

Within airbag deployment-control process 100 (FIG. 2), a task 110 intercepts deployment request $R_D$ from vehicular computer 24. This is accomplished by processor 36. Having intercepted deployment request $R_D$, processor 36 assesses the need to deploy airbag 28.

Figure 7:
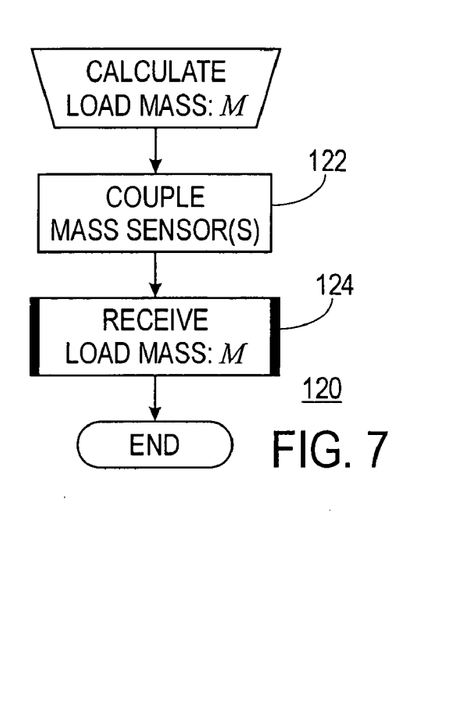
FIG. 7 shows a flowchart of a load-mass calculation subprocess in accordance with a preferred embodiment of the present invention.
Figure 8:
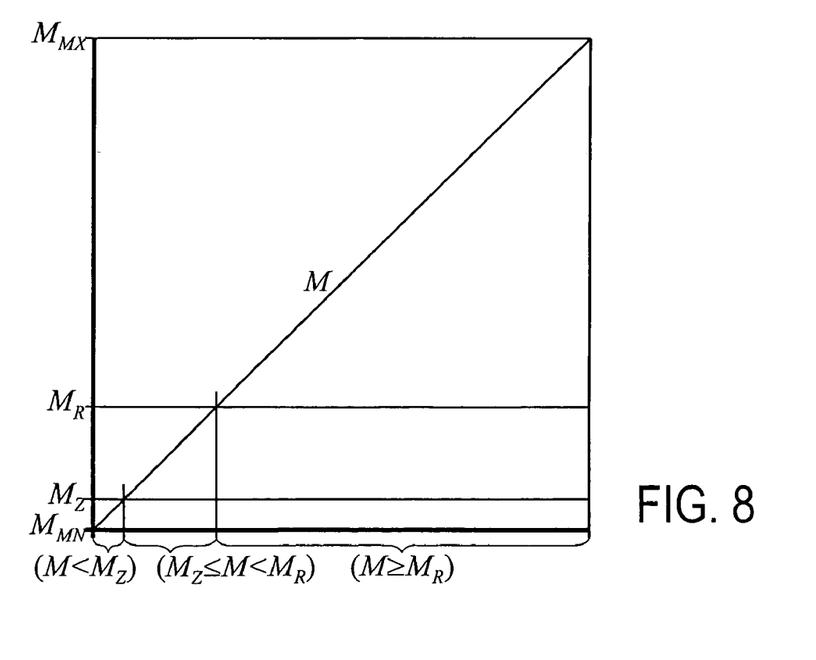
FIG. 8 shows a chart depicting a load mass for a load within a seat of the apparatus of FIG. 3 in accordance with a preferred embodiment of the present invention.
Figure 9:
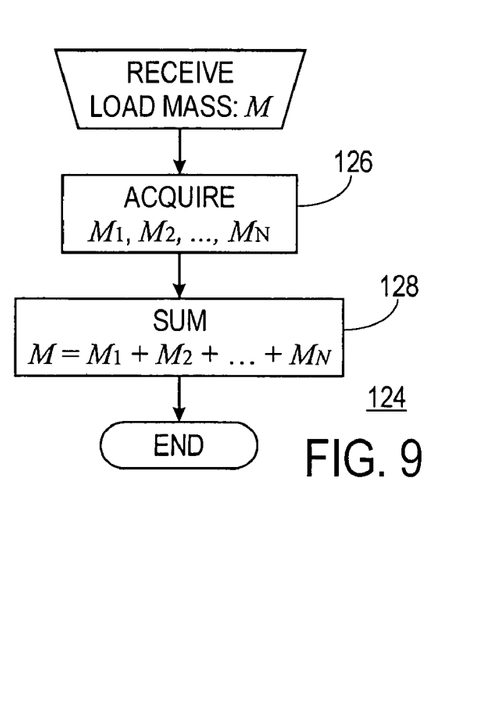
FIG. 9 shows a flowchart of a load-mass reception hypertask in accordance with a preferred embodiment of the present invention.

FIGS. 7 and 9 show flowcharts of a load-mass calculation subprocess 120 (FIG. 7) and a load-mass reception hypertask 124 (FIG. 9), and FIG. 8 shows a chart depicting a load mass M for load 40 within seat 30 of apparatus 20 in accordance with a preferred embodiment of the present invention. The following discussion refers to FIGS. 2 through 9.

Within process 100 (FIG. 2), subprocess 120 (FIGS. 2 and 7) calculates load mass M for load 40 of seat 30. Within subprocess 120, one or more mass sensors 38 are coupled to seat 30 in a task 122. In a task 124, processor 36 receives load mass M from mass sensors 38.

In the preferred embodiment, mass sensors 38 are coupled to the corners 48 of a frame 50 of seat 30. In this and other embodiments with a plurality of mass sensors 38, task 124 becomes hypertask 124 (i.e., a task of tasks). Within hypertask 124 (FIGS. 7 and 8), each mass sensor 38 acquires a partial load mass $M_P$ in a task 126, where P is an integral sequential number from 1 to N arbitrarily assigned to each of N mass sensors 38, i.e., $$M_P = M_1, M_P = M_2, \ldots, M_P = M_N. \qquad (1)$$

In a task 128, all partial load masses $M_P$ are summed to produce load mass M, i.e., $$M = M_1 + M_2 + \ldots + M_N. \qquad (2)$$

Mass sensors 38 may be any types of mass sensor known to those skilled in the art. Mass sensors 38 detect load mass M (if any). Load mass M has a minimum mass $M_{MN}$ of zero, i.e., seat 30 is empty (FIG. 3), but may include inanimate object 42 (FIG. 4), child 44 (FIG. 5), and/or adult 46 (FIG. 6). Load mass M therefore has a substantially undefined maximum mass $M_{MX}$ in the range of a few hundred kilograms. Mass sensors 38 therefore have a measuring range producing load mass M between minimum mass $M_{MN}$ and maximum mass $M_{MX}$, i.e., $$M_{MN} \leq M \leq M_{MX}. \qquad (3)$$

The use of a given type of sensor for mass sensor 38 does not depart from the spirit of the present invention.

Figure 10:
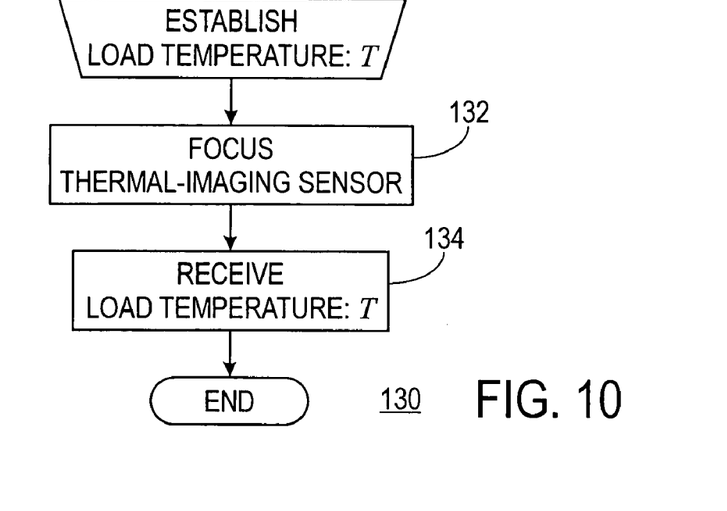
FIG. 10 shows a flowchart of a load-temperature establishment subprocess in accordance with a preferred embodiment of the present invention.
Figure 11:
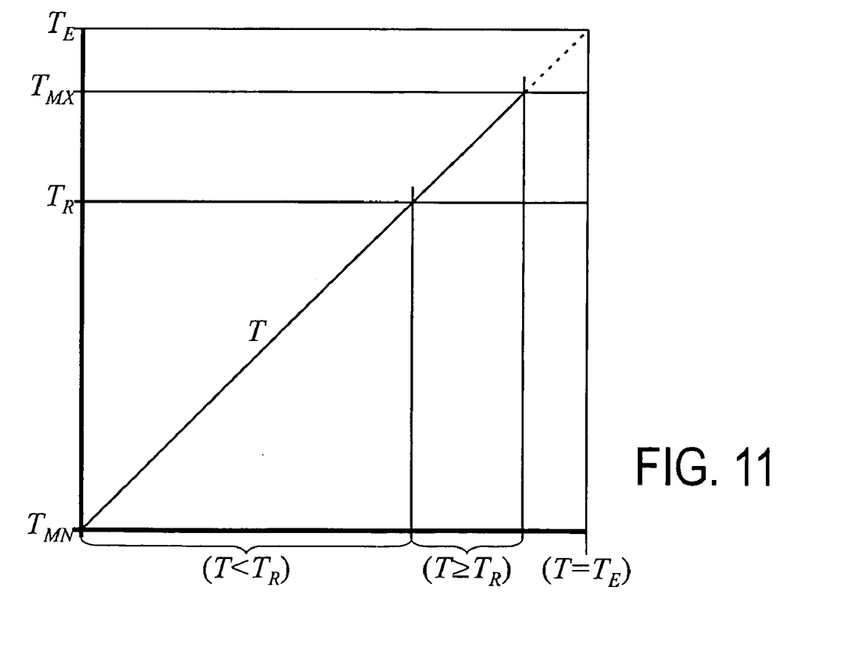
FIG. 11 shows a chart depicting a load temperature for a load within a seat of the apparatus of FIG. 3 in accordance with a preferred embodiment of the present invention.

FIG. 10 shows a flowchart of a load-temperature establishment subprocess 130, and FIG. 11 shows a chart depicting a load temperature T for load 40 within seat 30 of apparatus 20 in accordance with a preferred embodiment of the present invention. The following discussion refers to FIGS. 2 through 6, 10, and 11.

Within process 100 (FIG. 2), subprocess 130 (FIGS. 2 and 9) establishes load temperature T for load 40 of seat 30. Within subprocess 130, a thermal-imaging sensor 52 is mounted within motor vehicle 22 and focused upon seat 30 in a task 132. In a task 134, processor 36 receives load temperature T from thermal-imaging sensor 52.

Figure 3:
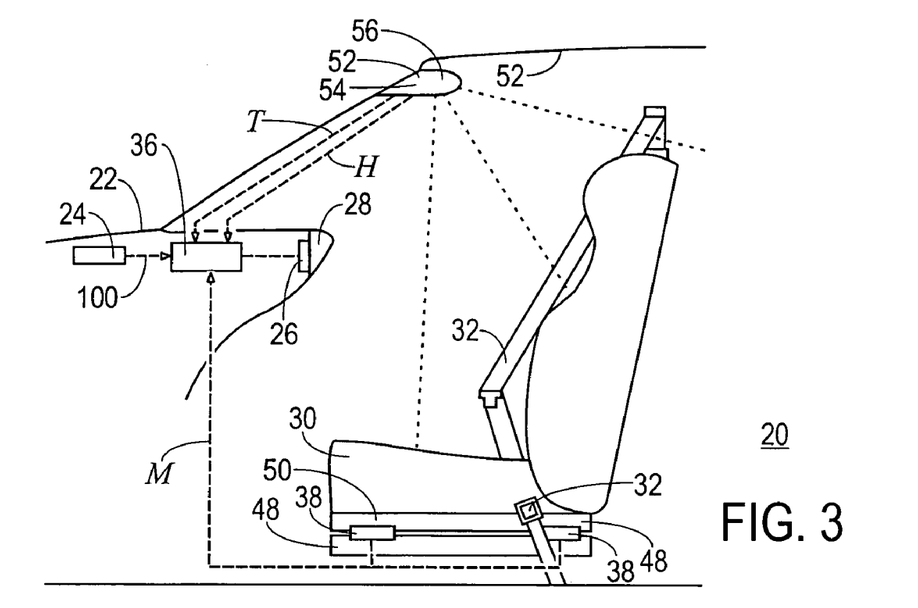
FIG. 3 shows a side view of an airbag deployment-control apparatus during deployment assessment with an empty seat in accordance with a preferred embodiment of the present invention.

Thermal-imaging sensor 52 may be any type of thermal sensor known to those skilled in the art. Thermal-imaging sensor 52 detects load temperature T (if any). Load temperature T has a minimum temperature $T_{MN}$ substantially equal to the ambient temperature, as when seat 30 is empty (FIG. 3). The range of load temperature T includes the body temperatures of child 44 (FIG. 5), adult 46 (FIG. 6), and a pet (not shown), and also includes the temperature of inanimate object 42 (FIG. 4) when warmer than ambient (e.g., a pot of hot food). Load temperature T therefore has a substantially undefined maximum temperature $T_{MX}$, typically under the boiling point of water. Thermal-imaging sensor 52 therefore has a detection range producing load temperature T between minimum temperature $T_{MN}$ and maximum temperature $T_{MX}$, i.e., $$T_{MN} \leq T \leq T_{MX}. \qquad (4)$$

The use of a given type of sensor for thermal-imaging sensor 52 does not depart from the spirit of the present invention.

Under some conditions, thermal-imaging sensor 52 may be unable to produce a valid load temperature T. In these conditions, it is desirable that the invalid load temperature T produced by thermal-imaging sensor 52 be classed as an error-temperature $T_E$. The use of error temperature $T_E$ for an invalid load temperature T allows process 100 to meaningfully interpret non-standard conditions.

The classification of an invalid load temperature T as error temperature $T_E$ may be done by either thermal-imaging sensor 52 prior to issuance of load temperature T (i.e., prior to task 134), or by processor 36 after reception of load temperature T (i.e., after task 134), or by both. Regardless of where the classification of error temperature $T_E$ is accomplished, the desired effect is that thermal-imaging sensor 52 produces load temperature T, where load temperature T is either a temperature value or error temperature $T_E$.

Figure 12:
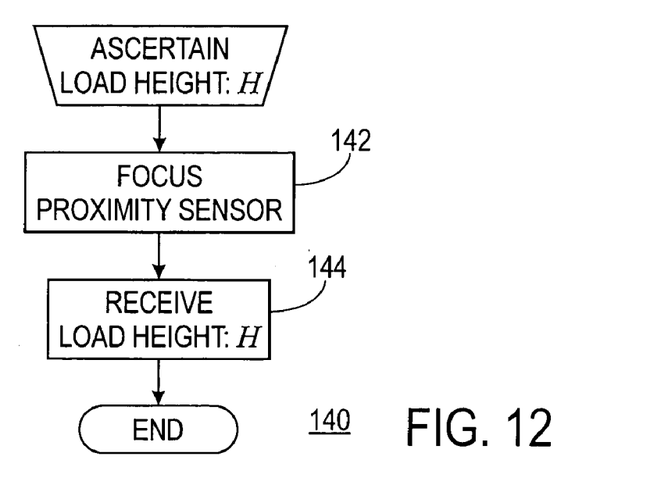
FIG. 12 shows a flowchart of a load-height ascertainment subprocess in accordance with a preferred embodiment of the present invention.
Figure 13:
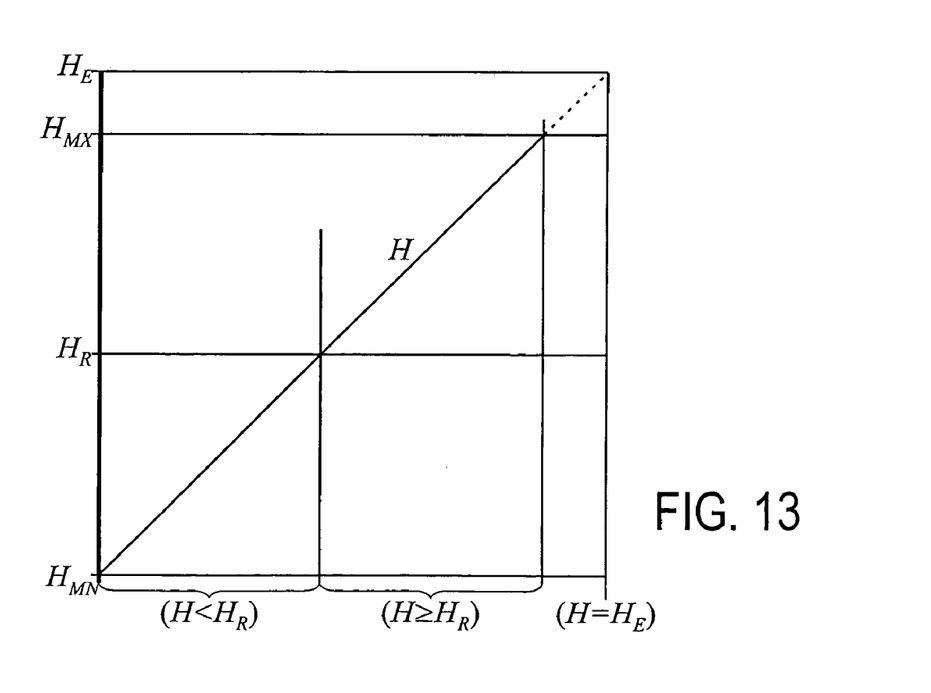
FIG. 13 shows a chart depicting a load height for a load within a seat of the apparatus of FIG. 3 in accordance with a preferred embodiment of the present invention.

FIG. 12 shows a flowchart of a load-height ascertainment subprocess 140, and FIG. 13 shows a chart depicting a load height H for load 40 within seat 30 of apparatus 20 in accordance with a preferred embodiment of the present invention. The following discussion refers to FIGS. 2 through 6, 12, and 13.

Within process 100 (FIG. 2), subprocess 140 (FIGS. 2 and 10) ascertains load height H for load 40 of seat 30. Within subprocess 140, a proximity sensor 54 is mounted within motor vehicle 22 and focused upon seat 30 in a task 142. In a task 144, processor 36 receives load height H from proximity sensor 54.

Proximity sensor 54 may be any type of proximity sensor known to those skilled in the art. Proximity sensor 54 detects load height H (if any). Load height H has a minimum height $H_{MN}$ substantially equal to zero, i.e., seat 30 is empty (FIG. 3). The range of load height H includes the height of a seated child 44 (FIG. 5) and adult 46 (FIG. 6). Inanimate object 42 (FIG. 4) is recognized as having a potential height over then entire range of load height H. Load height H therefore has a undefined maximum height $H_{MX}$ substantially equal to the maximum height of any load 40 that will physically fit in seat 30. Proximity sensor 54 therefore has a detection range producing load height H between minimum height $H_{MN}$ (i.e., the empty surface of seat 30) and maximum height $H_{MX}$ (i.e., a ceiling 58 of motor vehicle 22), i.e., $$H_{MN} \leq H \leq H_{MX}. \qquad (5)$$

The use of a given type of sensor for proximity sensor 54 does not depart from the spirit of the present invention.

When load 40 is other than empty seat 30, seated child 44, or adult 46, and under certain other conditions, proximity sensor 54 may be unable to produce a valid load height H. In these conditions, it is desirable that the invalid load height H produced by proximity sensor 54 be classed as an error-height $H_E$. The use of error height $H_E$ for an invalid load height. H allows process 100 to meaningfully interpret non-standard conditions.

The classification of an invalid load height H as error height $H_E$ may be done by either proximity sensor 54 prior to issuance of load height H (i.e., prior to task 144), or by processor 36 after reception of load height H (i.e., after task 144), or by both. Regardless of where the classification of error height $H_E$ is accomplished, the desired effect is that proximity sensor 54 produces load height H, where load height H is either a height value or error height $H_E$.

In an alternative embodiment, an infrared sensor 56 may be used to serve as both thermal-imaging sensor 52 and proximity sensor 54. In this embodiment, infrared sensor 56 has two uses, typically under the control of processor 36. In a first use, infrared sensor 56 scans seat 30 and any load 40 therein to detect load temperature T. In this use, infrared sensor 56 serves as thermal-imaging sensor 52. In a second use, infrared sensor 56 scans seat 30 and any load 40 therein to detect load height H. In this use, infrared sensor 56 serves as proximity sensor 54.

Those of ordinary skill in the art will appreciate that the use of infrared sensor 56, or any other single sensor, to effect the functions of thermal-imaging sensor 52 and/or proximity sensor 54 is desirable from a standpoint of cost and efficiency, but is not a requirement of the present invention. The type of sensor(s) used to implement either thermal-imaging sensor 52 or proximity sensor 54 is not germane to this discussion. The use of any given sensor type(s) does not depart from the spirit of the present invention.

Figure 14:
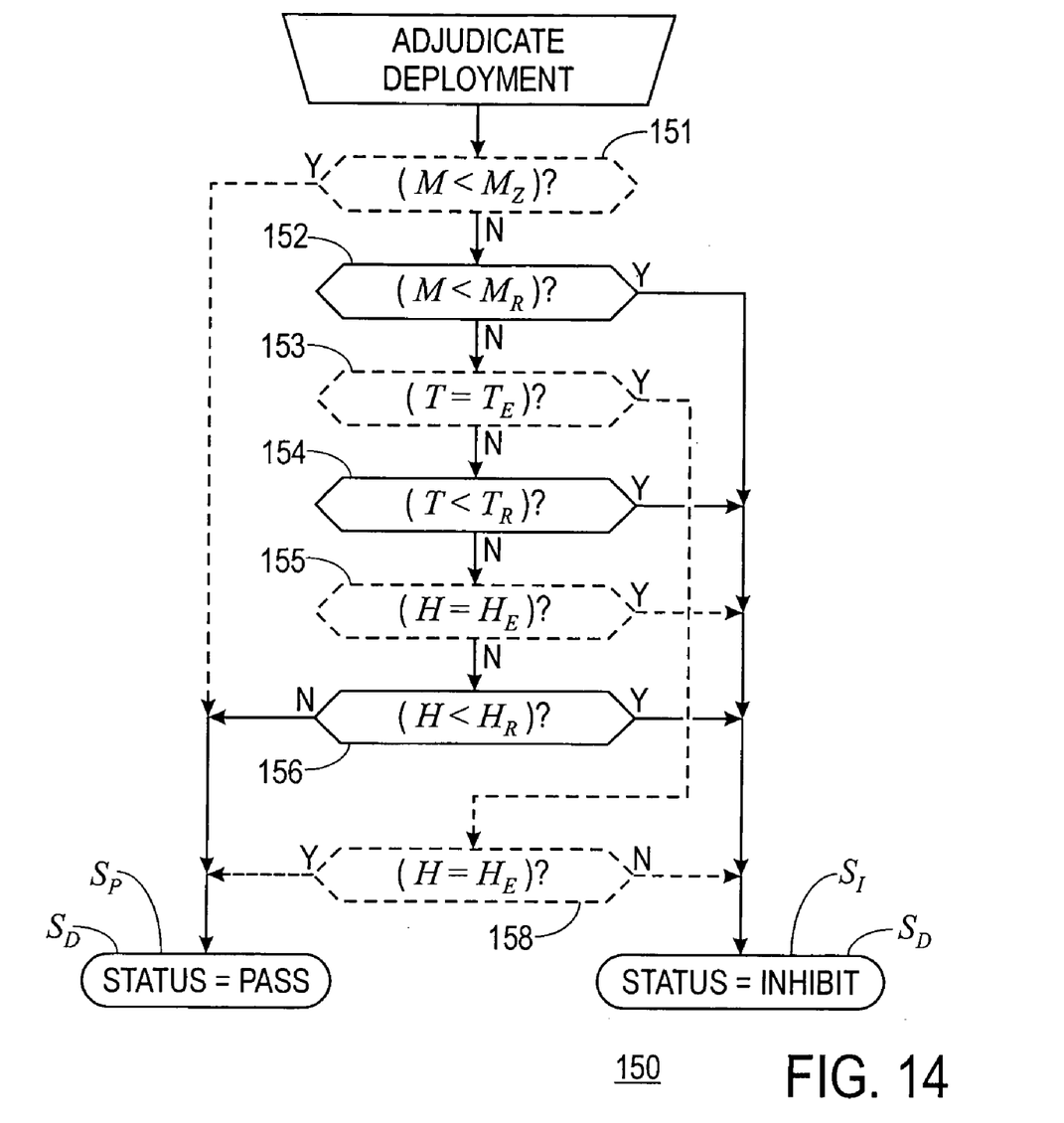
FIG. 14 shows a flowchart of a deployment-status adjudication subprocess in accordance with a preferred embodiment of the present invention.

FIG. 14 shows a flowchart of a deployment-status adjudication subprocess 150 in accordance with a preferred embodiment of the present invention. The following discussion refers to FIGS. 2 through 6 and 14.

Within process 100 (FIG. 2), subprocess 150 (FIGS. 2 and 14) adjudicates a deployment status $S_D$ of deployment request $R_D$. Deployment request $R_D$ was issued by vehicular computer 24 and intended for deployment activator 26 to cause deployment of airbag 28. Processor 36 intercepted deployment request $R_D$ in task 110 before it reached deployment activator 26. In subprocess 150, process 100 determines if deployment request $R_D$ is passed on to deployment activator 26 (causing deployment of airbag 28) or not.

Subprocess 150 adjudicates deployment status $S_D$ to be either pass status $S_P$ or inhibit status $S_I$. When deployment status $S_D$ is adjudicated to be pass status $S_P$, then process 100 proceeds to a task 160, in which deployment request $R_D$ is passed to deployment activator 26. This results in airbag 28 being deployed.

When deployment status $S_D$ is adjudicated to be inhibit status $S_I$, then process 100 proceeds to a task 170, in which deployment request $R_D$ is inhibited from being passed to deployment activator 26. This results in airbag 28 not being deployed.

The following discussion refers to FIGS. 2 through 6, 8, 11, 13, and 14.

A series of query tasks (FIG. 14) within subprocess 150 is used to adjudicate deployment status $S_D$. In a preferred embodiment, a query task 151 compares load mass M with a zero-reference mass $M_Z$ (FIG. 8). If query task 151 determines that load mass M is less than zero-reference mass $M_Z$, then subprocess 150 adjudicates that deployment status $S_D$ is pass status $S_P$, i.e., $$S_D = S_P \because M < M_Z. \quad (6)$$

That is subprocess 150 terminates and airbag 28 will be deployed. Those skilled in the art will appreciate that load temperature T and load height H have no effect upon this adjudication.

Figure 4:
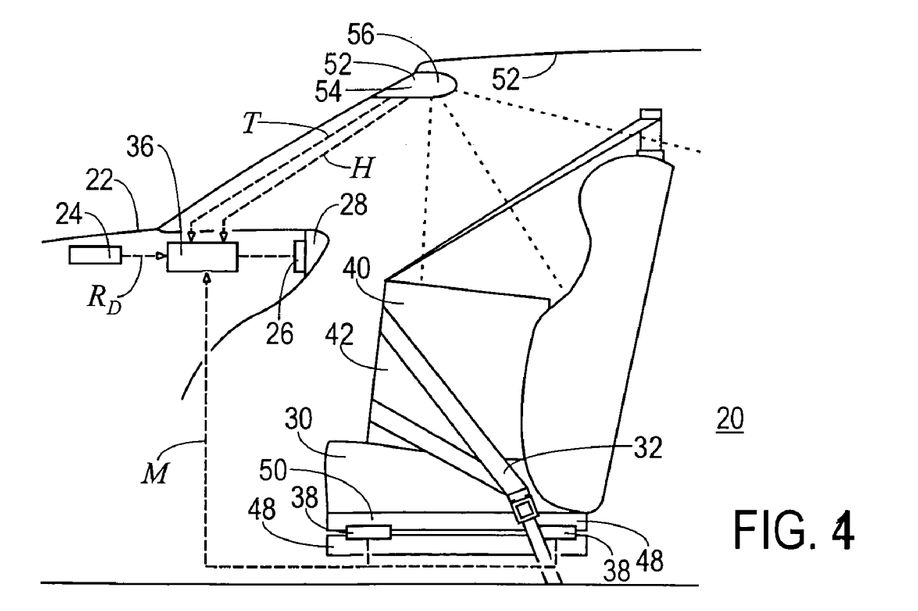
FIG. 4 shows a side view of the apparatus of FIG. 3 during deployment assessment with the seat containing an inanimate object in accordance with a preferred embodiment of the present invention.

Zero-reference mass $M_Z$ is slightly greater than zero. Therefore, if load mass M is less than zero-reference mass $M_Z$, then load mass M is substantially zero and seat 30 is substantially empty (FIG. 3). This condition allows an item of insignificant mass relative to child 44 (FIG. 5) to be ignored.

The purpose of zero-reference mass $M_Z$ and query task 151 is to allow deployment of airbag 28 when seat 30 is substantially empty (seat 30 is either empty or has only a small, lightweight object, such as a purse, thereupon). By deploying airbag 28 when seat 30 is substantially empty, additional restraint and protection is provided, for a driver seated in the driver's seat. When deployed, airbag 28 substantially fills the space over seat 30. This serves to limit sideways movement of the driver by providing a more functional protective cocoon, especially when used in conjunction with driver's front and side airbags. This cocoon increases driver protection.

If query task 151 determines that load mass M is not less than zero-reference mass $M_Z$, then load mass M is greater than or equal to zero-reference mass $M_Z$.

In an alternative embodiment, query task 151 may be omitted. This is demonstrated in FIG. 14 by a dash outline for query task 151. Omission of query task 151 includes the omission of zero-reference mass $M_Z$.

If query task 151 is omitted (equation 7a), or if query task 151 determines that load mass M is greater than or equal to zero-reference mass $M_Z$ (equations 7b), then a query task 152 compares load mass M with a reference mass $M_R$ (FIG. 8). If query task 152 determines load mass M is less than reference mass $M_R$ (FIG. 8), then subprocess 150 adjudicates that deployment status $S_D$ is inhibit status $S_I$, i.e., $$S_D = S_I \because M < M_R, \text{ or} \quad (7a)$$

$$S_D = S_I \because M_Z \leq M < M_R. \quad (7b)$$

That is, subprocess 150 terminates and airbag 28 will not be deployed. Those skilled in the art will appreciate that load temperature T and load height H have no effect upon this adjudication.

Reference mass $M_R$ is slightly greater than the assumed maximum mass of child 44 (FIG. 5), including any child seat (not shown) or other carrier. Were airbag 28 to deploy when child 44 is in seat 30, then child 44 would be placed at risk of injury or death by the deployment itself. Therefore, if load mass M is greater than zero-reference mass $M_Z$ and less than reference mass $M_R$, then airbag 28 is inhibited from deploying.

If query task 152 determines that load mass M is not less than reference mass $M_R$, then load mass M is greater than or equal to reference mass $M_R$. In a preferred embodiment, a query task 153 determines if load temperature T is error temperature $T_E$ (FIG. 11) or not. If query task 153 determines that load temperature T is error temperature $T_E$, then a query task 158 determines if load height H is error height $H_E$ (FIG. 13) or not. If query task 158 determines that load height H is error height $H_E$, then subprocess 150 adjudicates that deployment status $S_D$ is pass status $S_P$, i.e., $$S_D = S_P \because M \geq M_R \text{ AND } T = T_E \text{ AND } H = H_E. \quad (8)$$

That is, subprocess 150 terminates and airbag 28 will be deployed.

By deploying when load temperature T is error temperature $T_E$ and load height H is error height $H_E$, then subprocess 150 may more accurately control the deployment of airbag 28 when tasks 230 and 240 (FIG. 2) are unable to accurately provide values for load temperature T and load height H. Without accurate values for both load temperature T and load height H, then subprocess 150 treats load temperature T and load height H as though they do not exist. Subprocess 150 then assumes that, if load mass M is greater than or equal to reference mass $M_R$ (i.e., greater than the maximum assumed mass of child 44 (FIG. 5), that load 40 is adult 46 (FIG. 6). Even though this adjudication by mass alone does not take into account inanimate object 42 (FIG. 4), the failure to deploy airbag 28 for child 44 presents a significant benefit.

If query task 158 determines that load height H is not error height $H_E$, then subprocess 150 adjudicates that deployment status $S_D$ is inhibit status $S_I$, i.e., $$S_D = S_I \because M \geq M_R \text{ AND } T = T_E \text{ AND } H = H_E. \quad (9)$$

That is, subprocess 150 terminates and airbag 28 will not be deployed.

If load temperature T is error temperature $T_E$ and load height H is not error height $H_E$, then the chances of misdeploying airbag 28 for child 44 increase significantly. To prevent a chance of injury or death to child 44 by the deployment of airbag 28, airbag 28 is inhibited from being deployed.

In an alternative embodiment, query task 153 may be omitted. This is demonstrated in FIG. 14 by a dash outline for query task 153. Omission of query task 151 includes the omission of query task 158 and error temperature $T_E$, but not necessarily the omission of error height $H_E$.

If query task 153 is omitted, or if query task 153 determines that load temperature T is not error temperature $T_E$, then a query task 154 compares load temperature T to a reference temperature $T_R$. If query task 154 determines that load temperature T is less than reference temperature $T_R$, then subprocess 150 adjudicates that deployment status $S_D$ is inhibit status $S_I$, i.e., $$S_D = S_I \because M \geq M_R \text{ AND } T < T_R. \tag{10a}$$

That is, subprocess 150 terminates and airbag 28 will not be deployed. Those skilled in the art will appreciate that load height H has no effect upon this adjudication.

Reference temperature $T_R$ is slightly less than body temperature for a human being. Since any common pet having a mass greater than reference mass $M_R$ is almost invariably a large dog with an even higher body temperature, the assumption is that an insufficient body temperature designates inanimate object 42 (FIG. 4). The deployment of airbag 28 when load 40 is inanimate object 42 may cause inanimate object 42 to be flung about, thereby posing an additional risk to the driver.

FIG. 14 depicts the several query tasks of subprocess 150 as cascaded. Those skilled in the art will appreciate that this is not a requirement of the present invention, and that other methodologies of implementing subprocess 150 may be used without departing from the spirit of the present invention.

In an alternative embodiment, load temperature T may be evaluated independently of load mass M. In such an embodiment, subprocess 150 adjudicates that deployment status $S_D$ is inhibit status $S_I$ without requiring that load mass M be greater than reference mass $M_R$, i.e., $$S_D = S_I \because T < T_R. \tag{10b}$$

That is, subprocess 150 terminates and airbag 28 will not be deployed. Those skilled in the art will appreciate that load mass M and load height H have no effect upon this adjudication.

The assumption here is that, since reference temperature $T_R$ is slightly less than body temperature for a human being, anytime load temperature T is less than reference temperature $T_R$, load 40 is inanimate object 42 (FIG. 4).

If query task 154 determines that load temperature T is not less than reference temperature $T_R$, then load temperature T is greater than or equal to reference temperature $T_R$. In a preferred embodiment, a query task 155 determines if load height H is error height $H_E$ (FIG. 13) or not. If query task 155 determines that load height H is error height $H_E$, then subprocess 150 adjudicates that deployment status $S_D$ is inhibit status $S_I$, i.e., $$S_D = S_I \because M \geq M_R \text{ AND } T \geq T_E \text{ AND } H = H_E. \tag{11}$$

That is, subprocess 150 terminates and airbag 28 will not be deployed.

If load temperature T is less than reference temperature $T_R$ and load height H is error height $H_E$, then the chances of mis-deploying airbag 28 for child 44 increase significantly. To prevent a chance of injury or death to child 44 by the deployment of airbag 28, airbag 28 is inhibited from being deployed.

In an alternative embodiment, query task 155 may be omitted. This is demonstrated in FIG. 14 by a dash outline for query task 155. Omission of query task 155 includes the omission of error height $H_E$.

If query task 155 is omitted, or if query task 155 determines that load height H is not error height $H_E$, then a query task 156 compares load height H to a reference height $H_R$. If query task 156 determines that load height H is less than reference height $H_R$, then subprocess 150 adjudicates that deployment status $S_D$ is inhibit status $S_I$, i.e., $$S_D = S_I \because M \geq M_R \text{ AND } T \geq T_R \text{ AND } H < H_R. \tag{12a}$$

That is, subprocess 150 terminates and airbag 28 will not be deployed.

Reference height $H_R$ is slightly greater than the assumed height of child 44 (FIG. 5) when seated in seat 30. Therefore, the assumption is that if load height H is less than reference height $H_R$, then load 40 might be child 44. To prevent a chance of injury or death to child 44 by the deployment of airbag 28, airbag 28 is inhibited from being deployed.

In an alternative embodiment, load height H may be evaluated independently of load mass M and load temperature T. In such an embodiment, subprocess 150 adjudicates that deployment status $S_D$ is inhibit status $S_I$ without requiring that load mass M be greater than reference mass $M_R$ and load temperature T be greater than reference temperature $T_R$, i.e., $$S_D = S_I \because H < H_R. \tag{12b}$$

That is, subprocess 150 terminates and airbag 28 will not be deployed. Those skilled in the art will appreciate that load mass M and load temperature T have no effect upon this adjudication.

Figure 5:
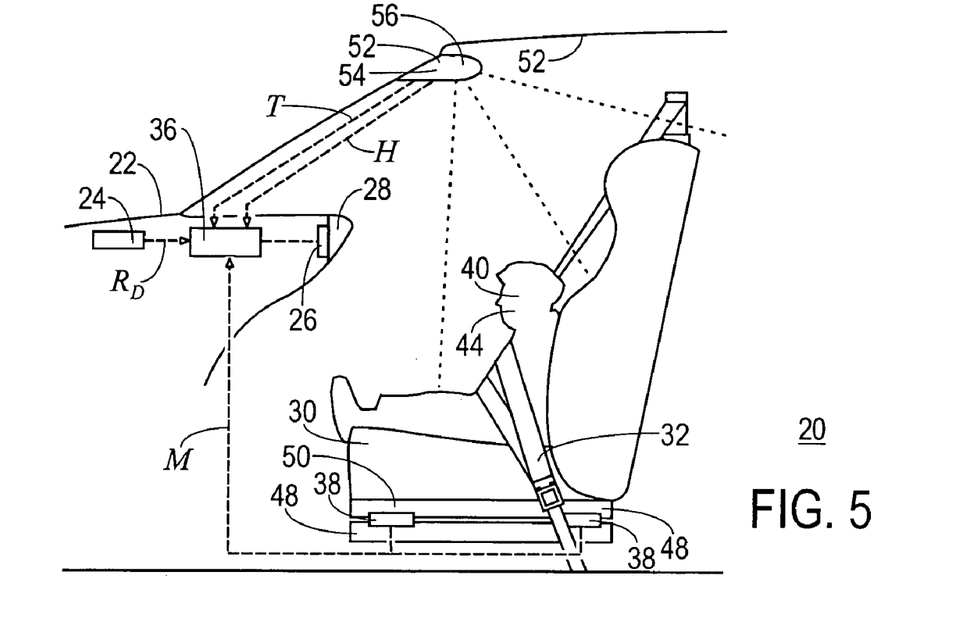
FIG. 5 shows a side view of the apparatus of FIG. 3 during deployment assessment with the seat containing a child in accordance with a preferred embodiment of the present invention.
Figure 6:
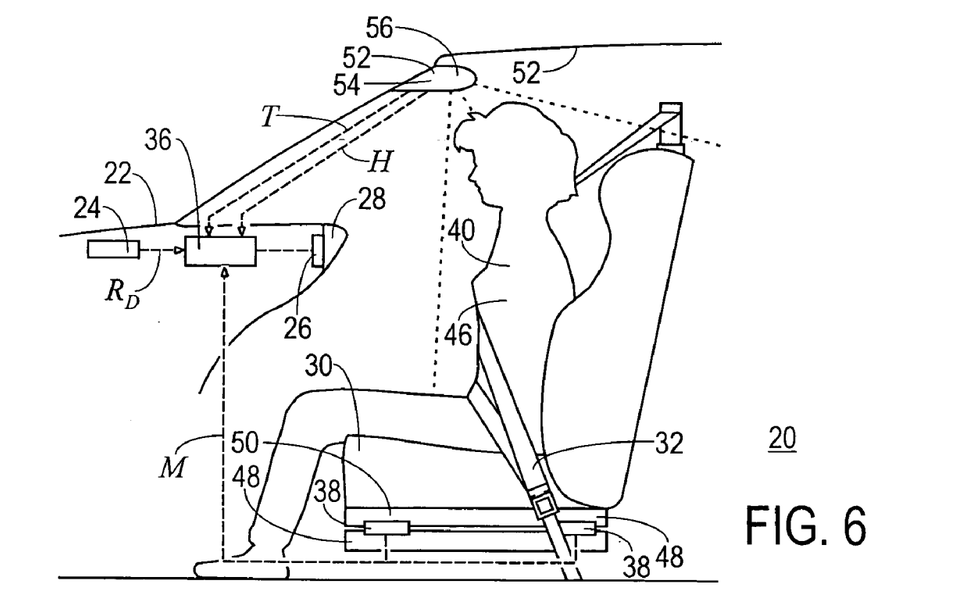
FIG. 6 shows a side view of the apparatus of FIG. 3 during deployment assessment with the seat containing an adult in accordance with a preferred embodiment of the present invention.

The assumption here is that, since reference height $H_R$ is slightly greater than height of child 44 seated in seat 30, anytime load height H is less than reference height $H_R$, load 40 may be child 44 (FIG. 5).

If query task 156 determines that load height H is not less than reference height $H_R$, then load height H is greater than or equal to reference height $H_R$, then subprocess 150 adjudicates that deployment status $S_D$ is pass status $S_P$, i.e., $$S_D = S_P \because M \geq M_Z \text{ AND } T \geq T_R \text{ AND } H \geq H_R. \tag{13}$$

That is, subprocess 150 terminates and airbag 28 will be deployed.

If load mass M is greater than or equal to reference mass $M_R$ (i.e., load mass M is greater than the assumed maximum mass of child 44), load temperature T is greater than or equal to reference temperature $T_R$ (i.e., load temperature T is indicative of child 44 or adult 46), and load height H is greater than or equal to reference height $H_R$ (load height H is greater than the assumed maximum height of child 44), then load 44 is most likely adult 46 (FIG. 6). Airbag 28 is deployed when load 40 is adult 46.

Those skilled in the art will appreciate that the methodology utilized to implement subprocess 150 as depicted in FIG. 14 and discussed hereinbefore is one of a plurality of methodologies. Other methodologies (e.g., a variant order of the query tasks) may be utilized without departing from the spirit of the present invention.

Figure 15:
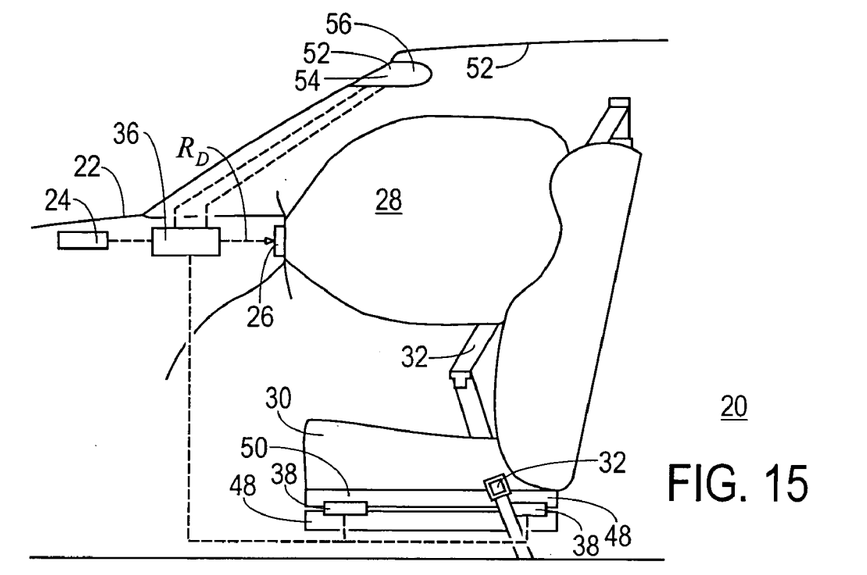
FIG. 15 shows a side view of the apparatus of FIG. 3 depicting an empty seat during airbag deployment in accordance with a preferred embodiment of the present invention.
Figure 16:
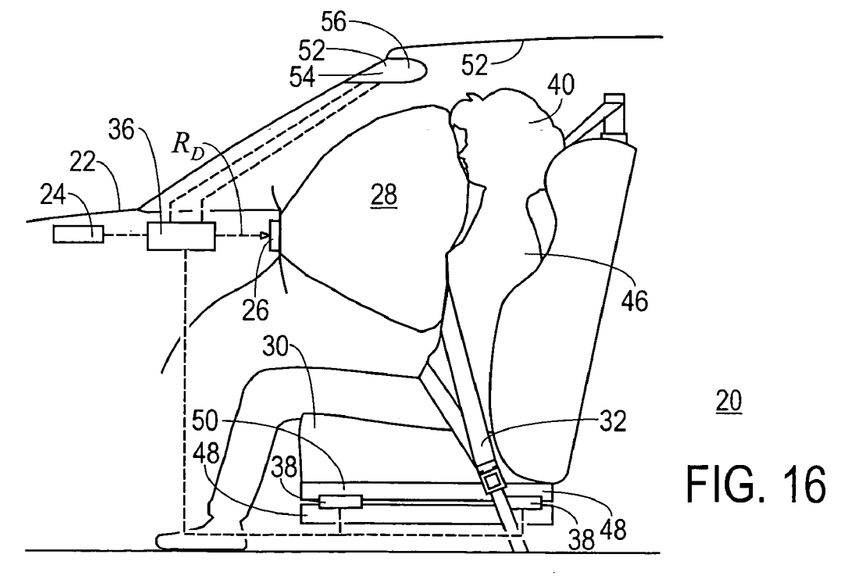
FIG. 16 shows a side view of the apparatus of FIG. 3 depicting an adult during airbag deployment in accordance with a preferred embodiment of the present invention.

FIGS. 15 and 16 show side views of apparatus 20 during airbag deployment depicting seat 30 as empty (FIG. 15) and containing adult 46 (FIG. 16) in accordance with a preferred embodiment of the present invention. The adjudication operations of subprocess 150 are summarized in TABLE 1 hereinafter. The following discussion refers to FIGS. 2, 15, and 16, and to TABLE 1.

TABLE 1

| Load Mass M | Load Temp. T | Load Height H | Deployment Status $S_D$ | Equations |
|---|---|---|---|---|
| $M < M_Z$ | N/A | N/A | Pass Status $S_P$ | 6 |
| $M < M_R$ | N/A | N/A | Inhibit Status $S_I$ | 7a |
| $M_Z \leq M < M_R$ | | | | 7b |
| $M \geq M_R$ | $T = T_E$ | $H = H_E$ | Pass Status $S_P$ | 8 |
| | | $H \neq H_E$ | Inhibit Status $S_I$ | 9 |
| N/A | $T < T_R$ | N/A | Inhibit Status $S_I$ | 10a |
| | | | | 10b |
| $M \geq M_R$ | $T \geq T_R$ | $H = H_E$ | Inhibit Status $S_I$ | 11 |
| N/A | N/A | $H < H_R$ | Inhibit Status $S_I$ | 12a |
| | | | | 12b |
| $M \geq M_R$ | $T \geq T_R$ | $H \geq H_R$ | Pass Status $S_P$ | 13 |

When subprocess 150 adjudicates deployment status $S_D$ to be pass status $S_P$, then a task 160 of process 100 (FIG. 2) passes deployment request $R_D$ on to deployment activator 26 in motor vehicle 22. Airbag 28 is then deployed.

If load mass M is less than zero-reference mass $M_Z$ (equation 6), then seat 30 is assumed to be substantially empty and airbag 28 deploys to substantially occupy the space above substantially empty seat 30 (FIG. 15). This provides additional restraint and protection for the driver seated in the driver's seat by limiting sideways movement of the driver and providing a more functional protective cocoon.

If load mass M is greater than or equal to reference mass $M_R$, load temperature T is greater than or equal to reference temperature $T_R$, and load height H is greater than or equal to reference height $H_R$ (equation 13), then load 40 is assumed to be adult 46 (FIG. 16) and is deployed to provide restraint and protection for adult 46.

If load mass M is greater than or equal to reference mass $M_R$, but load temperature T and load height H are error temperature $T_E$ and error height $H_E$, respectively (equation 8), then load 40 is assumed to probably be adult 46 (FIG. 16) and airbag 28 is deployed to provide restraint and protection for adult 46.

The following discussion refers to FIGS. 2, 4, and 5.

When subprocess 150 adjudicates deployment status $S_D$ to be inhibit status $S_I$, then a task 170 of process 100 (FIG. 2) inhibits deployment request $R_D$ from being passed on to deployment activator 26 in motor vehicle 22. That is, deployment request $R_D$ is ignored (i.e., discarded), and airbag 28 is not deployed.

If load mass M is less than reference mass $M_R$ (equations 7a and 7b), then load 40 is assumed to possibly be child 44 (FIG. 5) and airbag 28 is not deployed.

If load temperature T is less than reference temperature $T_R$ (equations 10a and 10b), then load 40 is assumed to probably be inanimate object 42 (FIG. 4) and airbag 28 is not deployed.

If load height H is less than reference height $H_R$ (equations 12a and 12b), then load 40 is assumed to possibly be child 44 (FIG. 5) and airbag 28 is not deployed.

If load temperature T is error temperature $T_R$ or load height H is error height $H_R$, but not both (equations 9 and 11), then load 40 is indeterminate and airbag 28 is not deployed.

In summary, the present invention teaches process 100 and apparatus 20 for control of a deployment of an airbag 28 for a seat 30 in a motor vehicle 22 upon issuance of a deployment request $R_D$ by a vehicular computer 24 within motor vehicle 22. Process 100 and apparatus 20 determine occupancy of seat 30 prior to deployment of airbag 28. Process 100 and apparatus 20 deploy airbag 28 when seat 30 is either empty or occupied by adult 46. Process 100 and apparatus 20 inhibit deployment of airbag 28 when seat 30 is occupied by either inanimate object 42 or child 44.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for control of a deployment of an airbag for a seat in a motor vehicle upon issuance of a deployment request by a vehicular computer within said motor vehicle, said method comprising:
   intercepting said deployment request issued by said vehicular computer and intended for a deployment activator coupled to said airbag;
   calculating a load mass of a load within said seat;
   establishing a load temperature of said load;
   ascertaining a load height of said load;
   adjudicating a deployment status for said deployment of said airbag in response to said load mass, said load temperature, and said load height, wherein said adjudicating activity adjudicates said deployment status is to be one of a pass status and an inhibit status;
   passing said deployment request to said deployment activator when said adjudicating activity adjudicates said deployment status is said pass status; and
   inhibiting said deployment request from being passed to said deployment activator when said adjudicating activity adjudicates said deployment status is said inhibit status.

2. A method as claimed in claim 1 wherein said adjudicating activity adjudicates said deployment status is to be one of:
   said pass status when:
      said load mass is greater than or equal to a predetermined mass, said load temperature is greater than or equal to a predetermined temperature, and said load height is greater than or equal to a predetermined height; and
   said inhibit status when one of:
      said load mass is less than said predetermined mass;
      said load temperature is less than said predetermined temperature; and
      said load height is less than said predetermined height.

3. A method as claimed in claim 1 wherein said calculating activity comprises:
   coupling a mass sensor to said seat; and
   receiving said load mass from said mass sensor.

4. A method as claimed in claim 3 wherein:
   said mass sensor is one of a plurality of mass sensors;
   said coupling activity couples each of said mass sensors to said seat; and
   said receiving activity comprises:
      acquiring a partial load mass from each of said mass sensors; and
      summing said partial load masses to obtain said load mass.

5. A method as claimed in claim 1 wherein said establishing activity comprises:
   focusing a thermal-imaging sensor upon said seat; and receiving said load temperature from said thermal-imaging sensor.

6. A method as claimed in claim 1 wherein said ascertaining activity comprises:
focusing a proximity sensor upon said seat; and
receiving said load height from said proximity sensor.

7. A method as claimed in claim 1 wherein said adjudicating activity adjudicates said deployment status is to be one of:
a pass status when one of:
said load mass is less than a first predetermined mass; and
said load mass is greater than or equal to a second predetermined mass, said load temperature is greater than or equal to a predetermined temperature, and said load height is greater than or equal to a predetermined height; and
said inhibit status when one of:
said load mass is greater than said first predetermined mass and less than said second predetermined mass;
said load temperature is less than said predetermined temperature; and
said load height is less than said predetermined height.

8. A method as claimed in claim 1 wherein:
said establishing activity comprises receiving said load temperature from a thermal-imaging sensor, wherein said load temperature is one of a value and an error temperature;
said adjudicating activity adjudicates said deployment status is to be one of:
said pass status when:
said load mass is greater than or equal to a predetermined mass, said load temperature is greater than or equal to a predetermined temperature, and said load height is greater than or equal to a predetermined height; and
said inhibit status when one of:
said load mass is less than said predetermined mass;
said load temperature is one of said error temperature and less than said predetermined temperature; and
said load height is less than said predetermined height.

9. A method as claimed in claim 1 wherein:
said ascertaining activity comprises receiving said load height from a proximity sensor, wherein said load height is one of a value and an error height;
said adjudicating activity adjudicates said deployment status is to be one of:
said pass status when:
said load mass is greater than or equal to a predetermined mass, said load temperature is greater than or equal to a predetermined temperature, and said load height is greater than or equal to a predetermined height; and
said inhibit status when one of:
said load mass is less than said predetermined mass;
said load temperature is less than said predetermined temperature; and
said load height is one of said error height and less than said predetermined height.

10. A method as claimed in claim 1 wherein:
said establishing activity comprises receiving said load temperature from a thermal-imaging sensor, wherein said load temperature is one of a value and an error temperature;
said ascertaining activity comprises receiving said load height from a proximity sensor, wherein said load height is one of a value and an error height;
said adjudicating activity adjudicates said deployment status is to be one of:
said pass status when one of:
said load mass is greater than or equal to a predetermined mass, said load temperature is greater than or equal to a predetermined temperature, and said load height is greater than or equal to a predetermined height; and
said load mass is greater than or equal to said predetermined mass, said load temperature is said error temperature, and said load height is said error height; and
said inhibit status when one of:
said load mass is less than said predetermined mass;
said load temperature is less than said predetermined temperature;
said load height is less than said predetermined height;
said load mass is greater than or equal to said predetermined mass, said load temperature is said error temperature and said load height is greater than or equal to said predetermined height; and
said load mass is greater than or equal to said predetermined mass, said load temperature is greater than or equal to said predetermined temperature, and said load height is said error height.

11. An apparatus for control of a deployment of an airbag for a seat in a motor vehicle upon issuance of a deployment request by a vehicular computer within said motor vehicle, said apparatus comprising:
a mass sensor coupled to said seat and configured to determine a load mass of a load within said seat;
a thermal-imaging sensor focused upon said seat and configured to determine a load temperature of said load;
a proximity sensor focused upon said seat and configured to determine a load height of said load; and
a processor configured to:
intercept said deployment request issued by said vehicular computer and intended for a deployment activator;
adjudicate a deployment status for said deployment request in response to said load mass, in response to said load temperature, and said load height, said deployment status being one of a pass status and an inhibit status;
pass said deployment request to said deployment activator when said deployment status is said pass status; and
inhibit said deployment request from being passed to said deployment activator when said deployment status is said inhibit status.

12. An apparatus as claimed in claim 11 wherein said mass sensor is coupled to a frame of said seat.

13. An apparatus as claimed in claim 11 wherein:
said mass sensor is one of a plurality of mass sensors; and
each of said mass sensors is coupled to a corner of a frame of said seat.

14. An apparatus as claimed in claim 11 wherein:
said mass sensor is one of a plurality of mass sensors:
each of said mass sensors is configured to determine a proportionate partial load mass of said load;

said processor is additionally configured to sum said partial load mass from each of said mass sensors to produce said load mass.

15. An apparatus as claimed in claim 11 wherein said processor is configured to adjudicate said deployment status as one of:
said pass status when:
said load mass is greater than or equal to a predetermined mass, said load temperature is greater than or equal to a predetermined temperature, and said load height is greater than or equal to a predetermined height; and
said inhibit status when one of:
said load mass is less than said predetermined mass;
said load temperature is less than said predetermined temperature; and
said load height is less than said predetermined height.

16. An apparatus as claimed in claim 11 wherein said processor is configured to adjudicate said deployment status as one of:
said pass status when one of:
said load mass is less than a first predetermined mass; and
said load mass is greater than or equal to a second predetermined mass, said load temperature is greater than or equal to a predetermined temperature, and said load height is greater than or equal to a predetermined height; and
said inhibit status when one of:
said load mass is greater than or equal to said first predetermined mass and less than said second predetermined mass;
said load temperature is less than said predetermined temperature; and
said load height is less than said predetermined height.

17. An apparatus as claimed in claim 11 wherein:
said thermal-imaging sensor is configured to determine said load temperature as one of a value and an error temperature;
said proximity sensor is configured to determine said load height as one of a value and an error height; and
said processor is configured to adjudicate said deployment status as one of:
said pass status when one of:
said load mass is greater than or equal to a predetermined mass, said load temperature is greater than or equal to a predetermined temperature, and said load height is greater than or equal to a predetermined height; and
said load mass is greater than or equal to said predetermined mass, said load temperature is said error temperature, and said load height is said error height; and
said inhibit status when one of:
said load mass is less than said predetermined mass;
said load temperature is less than said predetermined temperature;
said load height is less than said predetermined height;
said load temperature is said error temperature, and said load height is greater than or equal to said predetermined height; and
said load temperature is greater than or equal to said predetermined temperature, and said load height is said error height.

18. An apparatus as claimed in claim 11 comprising an infrared sensor having a first use and a second use, wherein:
said infrared sensor comprises said thermal-imaging sensor during said first use; and
said infrared sensor comprises said proximity sensor during said second use.

19. A method for control of a deployment of an airbag for a seat in a motor vehicle upon issuance of a deployment request by a vehicular computer within said motor vehicle, said method comprising:
intercepting said deployment request issued by said vehicular computer and intended for a deployment activator coupled to said airbag;
coupling a mass sensor to said seat;
focusing a thermal-imaging sensor upon said seat;
focusing a proximity sensor upon said seat;
receiving a load mass of a load within said seat from said mass sensor;
receiving a load temperature of said load from said thermal-imaging sensor;
receiving a load height of said load from said proximity sensor;
adjudicating a deployment status for said deployment of said airbag to be one of:
a pass status when one of:
said load mass is less than a first predetermined mass; and
said load mass is greater than or equal to a second predetermined mass, said load temperature is greater than or equal to a predetermined temperature, and said load height is greater than or equal to a predetermined height; and
said inhibit status when one of:
said load mass is greater than said first predetermined mass and less than said second predetermined mass;
said load temperature is less than said predetermined temperature; and
said load height is less than said predetermined height;
passing said deployment request to said deployment activator when said adjudicating activity adjudicates said deployment status is said pass status; and
inhibiting said deployment request from being passed to said deployment activator when said adjudicating activity adjudicates said deployment status is said inhibit status.

* * * * *

UNITED STATES PATENT AND TRADEMARK OFFICE
CERTIFICATE OF CORRECTION

PATENT NO. : 7,165,785 B2
APPLICATION NO. : 10/884065
DATED : July 2, 2004
INVENTOR(S) : Raffi Artine Bouladian It is certified that error appears in the above-identified patent and that said Letters Patent is hereby corrected as shown below:

Column 6, Line 42, "height. H" should be --height H--
Column 7, Line 40, "That is" should be --That is,--
Column 7, Line 55, "is provided, for a driver" should be --is provided for a driver--
Column 8, Line 5, "(equations 7b)" should be --(equation 7b)--
Column 8, Line 58, "AND H=$H_E$" should be --AND H$\neq$$H_E$--

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,165,785 B2 |
| APPLICATION NO. | : 10/884065 |
| DATED | : January 23, 2007 |
| INVENTOR(S) | : Raffi Artine Bouladian |

It is certified that error appears in the above-identified patent and that said Letters Patent is hereby corrected as shown below:

Column 6, Line 42, "height. H" should be --height H--
Column 7, Line 40, "That is" should be --That is,--
Column 7, Line 55, "is provided, for a driver" should be --is provided for a driver--
Column 8, Line 5, "(equations 7b)" should be --(equation 7b)--
Column 8, Line 58, "AND H=$H_E$" should be --AND H$\neq$$H_E$--

This certificate supersedes Certificate of Correction issued May 29, 2007.

Signed and Sealed this

Nineteenth Day of June, 2007

JON W. DUDAS
*Director of the United States Patent and Trademark Office*